US009143293B2

(12) United States Patent
Sayana et al.

(10) Patent No.: US 9,143,293 B2
(45) Date of Patent: *Sep. 22, 2015

(54) METHOD OF SIGNALING PARTICULAR TYPES OF RESOURCE ELEMENTS IN A WIRELESS COMMUNICATION SYSTEM

(75) Inventors: Krishna Kamal Sayana, Arlington Heights, IL (US); Tyler Brown, Mundelein, IL (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 13/495,516

(22) Filed: Jun. 13, 2012

(65) Prior Publication Data

US 2012/0327980 A1    Dec. 27, 2012

Related U.S. Application Data

(63) Continuation of application No. 12/431,305, filed on Apr. 28, 2009, now Pat. No. 8,208,434.

(51) Int. Cl.
*H04W 4/00* (2009.01)
*G04C 17/00* (2006.01)
*H04L 5/00* (2006.01)
(Continued)

(52) U.S. Cl.
CPC .............. *H04L 5/0035* (2013.01); *H04B 7/024* (2013.01); *H04L 5/006* (2013.01); *H04L 5/0023* (2013.01); *H04L 5/0032* (2013.01); *H04L 5/0037* (2013.01); *H04L 5/0048* (2013.01); *H04L 5/0094* (2013.01); *H04L 5/16* (2013.01); *H04B 7/0413* (2013.01); *H04L 25/0204* (2013.01);
(Continued)

(58) Field of Classification Search
USPC ........................................................ 370/329
See application file for complete search history.

(56) References Cited

U.S. PATENT DOCUMENTS

| | | | |
|---|---|---|---|
| 7,903,756 B2 | 3/2011 | Furman et al. | |
| 8,358,979 B2 | 1/2013 | Astely et al. | |

(Continued)

FOREIGN PATENT DOCUMENTS

| | | |
|---|---|---|
| EP | 1901491 A1 | 3/2008 |
| RU | 2331989 C2 | 8/2008 |

(Continued)

OTHER PUBLICATIONS

United States Patent and Trademark Office, "Non-Final Rejection" for U.S. Appl. No. 13/495,544 dated Mar. 25, 2013, 16 pages.
(Continued)

*Primary Examiner* — Gerald Smarth
(74) *Attorney, Agent, or Firm* — Lerner, David, Littenberg, Krumholz & Mentlik, LLP

(57) ABSTRACT

A wireless communication terminal including a transceiver coupled to a processor and corresponding methods are disclosed. The processor is configured to determine resource elements that carry data intended for the terminal from a set of allocated resource elements that carry data intended for the terminal excluding at least resource elements associated with a first set of one or more resource elements of a particular type that are shifted relative to a known reference signal pattern. The processor is also configured to decode the resource elements that carry the data intended for the terminal based on the resource elements that carry the data intended for the terminal.

20 Claims, 8 Drawing Sheets

(51) Int. Cl.
*H04B 7/02* (2006.01)
*H04L 5/16* (2006.01)
*H04B 7/04* (2006.01)
*H04L 25/02* (2006.01)

(52) U.S. Cl.
CPC ......... *H04L 25/0226* (2013.01); *H04L 25/0242* (2013.01)

(56) References Cited

U.S. PATENT DOCUMENTS

| | | | |
|---|---|---|---|
| 2008/0232240 A1* | 9/2008 | Baum et al. | 370/210 |
| 2008/0232494 A1* | 9/2008 | Pan et al. | 375/260 |
| 2008/0293424 A1 | 11/2008 | Cho et al. | |
| 2009/0011767 A1 | 1/2009 | Malladi et al. | |
| 2009/0225721 A1* | 9/2009 | Cudak et al. | 370/330 |
| 2009/0245331 A1* | 10/2009 | Palanki et al. | 375/148 |
| 2009/0249027 A1 | 10/2009 | Kim et al. | |
| 2009/0268685 A1 | 10/2009 | Chen et al. | |
| 2009/0285173 A1* | 11/2009 | Koorapaty et al. | 370/330 |
| 2009/0312028 A1 | 12/2009 | Burchfiel | |
| 2010/0067627 A1 | 3/2010 | Lincoln et al. | |
| 2010/0099428 A1 | 4/2010 | Bhushan et al. | |
| 2010/0103890 A1 | 4/2010 | Ishii et al. | |
| 2010/0202400 A1* | 8/2010 | Richardson et al. | 370/330 |
| 2010/0309801 A1 | 12/2010 | Jongren et al. | |
| 2010/0322100 A1 | 12/2010 | Wan et al. | |
| 2012/0327981 A1 | 12/2012 | Sayana et al. | |

FOREIGN PATENT DOCUMENTS

| | | |
|---|---|---|
| RU | 2007137130 A | 4/2009 |
| WO | 2006099062 A1 | 9/2006 |
| WO | 2008103317 A2 | 8/2008 |
| WO | 2008115588 A2 | 9/2008 |
| WO | 2009012350 A1 | 1/2009 |

OTHER PUBLICATIONS

Japanese Office Action for Japanese Patent Application No. 2012-503788 dated Jan. 22, 2013, 2 pages.
3GPP TSG RAN WG1 #56bis, R1-091247 "Multi-user MIMO enhancement in a LTE-A" Mar. 23, 2009, 3 pages.
3GPP TSG RAN WG1 #56bis, R1-091338 "DL Beamforming Enhancement for LTE Rel-9" Mar. 23, 2009, 5 pages.
3GPP; Technical Specification Group Radio Access Network; Evolved Universal Terrestrial Radio Access (E-UTRA); Physical Channels and Modulation (Release 8); Mar. 2009.
3GPP; Technical Specification Group Radio Access Network; Evolved Universal Terrestrial Radio Access (E-UTRA); Multiplexing and Channel Coding (Release 8); Mar. 2009.
3GPP; Technical Specification Group Radio Access Network; Evolved Universal Terrestrial Radio Access (E-UTRA); Physical Layer Procedures (Release 8); Mar. 2009.
3GPP TSG RAN1 #55, R1-084144 "Per-Cell Precoding Methods for Downlink Joint Processing CoMP; 11.4 Coordinated Multipoint Transmission/Reception (COMP)" ETRI; Prague, Czech Republic; Nov. 10-14, 2008.
3GPP TSG RAN1 #55, R1-084377 "Downlink Coordinated Transmission—Impact on Specification" Ericsson; Prague, Czech Republic; Nov. 10-14, 2008.
3GPP TSG RAN1 #55, R1-084408 "Common Reference Symbol and Mapping/Signaling for 8 Transmit Antennas" Motorola; Prague, Czech Republic; Nov. 10-14, 2008.
3GPP TSG RAN1 #55, RI-090022 "Considerations on Precoding Scheme for DL Joint Processing CoMP" Sharp; Ljubljana, Slovenia; Jan. 12-16, 2009.
3GPP TSG RAN1 #56, R1-090586, "Joint Processing Downlink Comp Reference Signal Support" Texas Instruments; Athens, Greece; Feb. 12-16, 2009.
3GPP TSG-RAN1 #56, R1-09796, "Downlink RS Design for Supporting Higher Order SU/MU-MIMO and coMP"; Athens, Greece; Feb. 8-13, 2009, 8 pages.
3GPP TSG RAN1 #56bis R1-091341 "CoMP Operation Framework" Seoul, South Korea, Mar. 18, 2009, 4 pages.
3GPP TSG RAN 1 #62bis, R1-105617 "Remaining Aspects and Signaling of PDSCH RE Muting" Motorola, Xian, Chian, Oct. 11-15, 2010, 3 pages.
3GPP TSG RAN 1 #62, R1-104701 "RE Muting for CSI-RS based Inter-cell Measurement and Signaling Support" Motorola, Madrid, Spain, Aug. 23-27, 2010, 3 pages.
International Search Report dated Aug. 2, 2010; Issued in Related PCT Application PCT/US2010/030982.
Decision of Grant for Application No. RU2011148228 dated Jun. 30, 2014.
International Preliminary Report on Patentability Chapter I for Application No. PCT/US2010/030982 dated Nov. 1, 2011.
RS Structure in Support of Higher-order MIMO, 3GPP TSG-RAN WG1 #56bis R1-091450, Mar. 23, 2009, pp. 1-10.
Japanese Office Action for Application No. 2014-164190 dated Jun. 16, 2015.

* cited by examiner

| FIG. 9A |
|---------|
| FIG. 9B |

FIG. 9A

METHOD OF SIGNALING PARTICULAR TYPES OF RESOURCE ELEMENTS IN A WIRELESS COMMUNICATION SYSTEM

CROSS-REFERNCE TO RELATED APPLICATIONS

The present application is a continuation of and commonly assigned U.S. application Ser. No. 12/431,305 filed on 28 Apr. 2009, the contents of which are incorporated herein by reference and from which benefits are claimed under 35 U.S.C. 120.

FIELD OF THE DISCLOSURE

The present disclosure relates generally to wireless communications and more particularly to signaling data mapping in an orthogonal frequency division multiplexed (OFDM) wireless communication system.

BACKGROUND

In wireless OFDM communication systems, a single OFDM symbol is composed of multiple subcarriers in frequency. Data modulation symbols are directly mapped onto these subcarriers. Some of the subcarriers may be reserved for reference/pilot symbols to assist demodulation at the User Equipment (UE). Further, all available subcarriers may be sub-divided into sets or groups of subcarriers for allocation to users with reduced overhead of signaling.

In typical OFDM based systems like $3^{rd}$ Generation Partnership Project (3GPP) Long Term Evolution (LTE), a block of 14 consecutive OFDM symbols are referred to as a subframe. Each sub-carrier location in each of the OFDM symbols is referred to as a resource element (RE), since a single data modulation symbol can be mapped to such a resource element. A resource block (RB) is defined as a block of REs composing of a set of 12 consecutive sub-carrier locations in frequency and 7 symbols of a slot. Each subframe is made of two slots, and hence 14 symbols. A minimum resource unit allocated to a user is the two RBs corresponding to two slots in a subframe for a total of 2×12×7 REs.

Some of the REs in the RB maybe reserved for Control Channel functions, the locations of which is known to the UE. The disclosure more specifically pertains to the data carrying portion of the RB. This is, for example, referred to as Physical Data Shared Channel (PDSCH) in Release-8 LTE. REs in the rest of the document refer to REs in such data carrying portion of the RBs.

Some of the REs in a RB are reserved for reference symbols (RSs) (also referred to as pilots) to help in the demodulation and other measurements at the UE. These reference symbols, as defined in Release 8 LTE can be further divided into two types. The first type is cell-specific reference symbols (CRS), which are cell-specific and "common" to all users, and are transmitted in all the RBs. CRS may or may not correspond to actual physical antennas of the transmitter, but CRS are associated with one or more antenna "ports", either physical or virtual.

The second type is user-specific or dedicated reference symbols (DRS), which are user-specific and hence applicable to that user only, and allocated in the Ras allocated to that user. Furthermore, DRS typically correspond to "precoded" or beam-formed RS, which can be directly used by a user for the demodulation of the data streams.

The location of the reference symbols is known to the user equipment from higher layer configurations. For example, depending on the number of antenna ports as configured by a transmission unit, a user equipment knows the location of all the reference symbols corresponding to all configured antenna ports. As another example, when a user equipment is instructed to use DRS, the user also knows the DRS locations which may depend on the user identification.

The data symbols intended for a user in his allocated RBs are mapped to the remaining set of REs after provisioning for the reference symbols. There is no ambiguity on data mapping between the user equipment and the transmission unit once the RS locations are clear.

In a future migration of a system, user-specific RS may be used widely with advanced Multiple-Input Multiple-Output (MIMO) modes like Coordinated Multipoint transmission (CoMP) and multi-user (MU) MIMO modes. Multiuser MIMO schemes refer to MIMO schemes where data is transmitted simultaneously to more than one user from the same set of RBs. A coordinated multipoint scheme is a scheme where data is transmitted to one or more users by coordinated scheduling and/or joint transmission from one or more transmission points. It is clear in such a case, that a user allocation may have to support reference symbols that may correspond to other users and/or other transmission points.

On the other hand, the advantage of using DRS for demodulation at the user equipment has two primary advantages. The actual transmission mode details, such as number of users, number and identity of transmission points, etc, need not be signaled to a user, as long as he can reconstruct the channel based on the DRS. Further, this allows more dynamic changes to the transmission mode(s) without the need to semi-static configuration by the higher layers, since a user need not be made aware of such configurations explicitly.

However, due to obligation of the assisting transmission points in a CoMP transmission or provisioning reference symbols for other users in a MU transmission, additional reference symbols may have to be supported. There is a need for a method of signaling a particular type of resource element in a wireless communication system.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 5 is an illustration of a resource block (RB) as in Release-8 specification of LTE with reference symbols and REs of a particular type;

DETAILED DESCRIPTION

Figure 1:
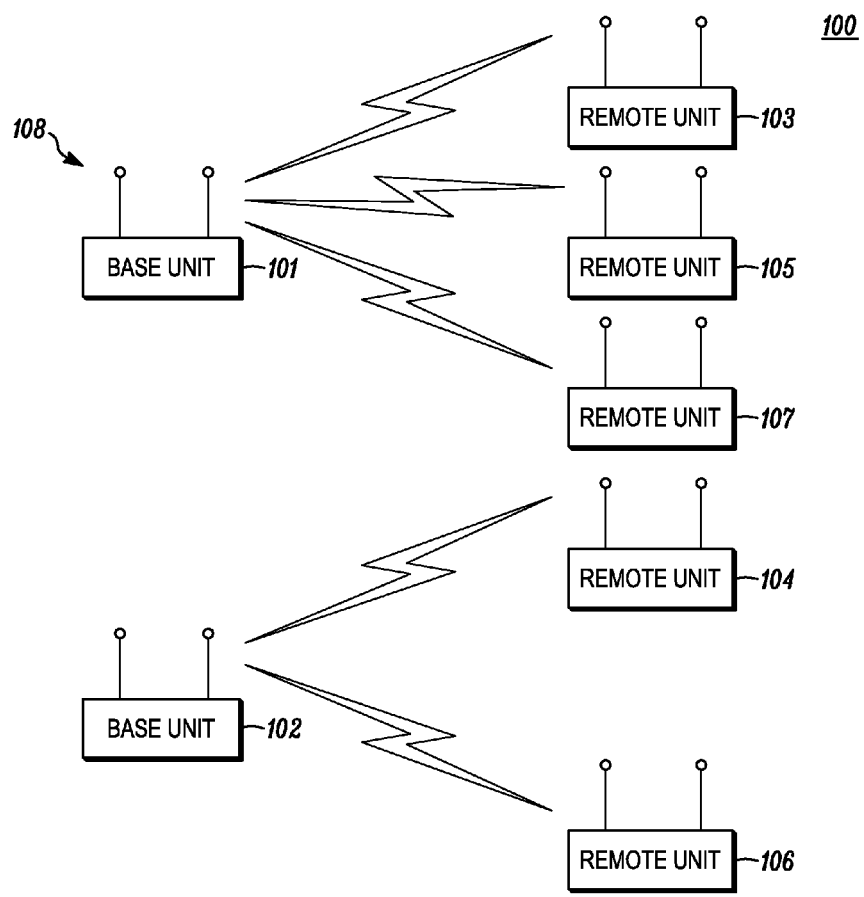
FIG. 1 is an exemplary illustration of a wireless communication system according to a possible embodiment.

Embodiments provide for method of signaling particular types of resource elements in a wireless communication system. The method can include, at a wireless terminal, receiving a message providing information of a set of allocated resource elements carrying data intended for the wireless terminal. The method can include receiving an indication corresponding to a resource element of a particular type within the set of allocated resource elements. The method can include decoding resource elements that carry data intended for the wireless terminal based on the message providing information and based on the indication.

Embodiments provide for method of signaling particular types of resource elements in a wireless communication system. The method can signal data resource element mapping. The method can include transmitting a message providing information of a set of allocated resource elements carrying data intended for a wireless terminal. The method can include transmitting an indication in an orthogonal frequency division multiplexing system, the indication corresponding to a resource element of a particular type within the set of allocated resource elements. The method can include mapping data modulation symbols to the set of allocated resource elements based on the indication.

Embodiments provide for a wireless terminal. The wireless terminal can include a transceiver configured to receive a message providing information of a set of allocated resource elements carrying data intended for the wireless terminal and configured to receive an indication corresponding to a resource element of a particular type within the set of allocated resource elements. The wireless terminal can include a processor coupled to the transceiver, the processor configured to control operations of the wireless terminal, the processor configured to decode resource elements that carry data intended for the wireless terminal based on the message providing information and based on the indication.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

In FIG. 1, a wireless communication system 100 can include one or more fixed base infrastructure units 101, 102 forming a network distributed over a geographical region for serving remote units. A base unit 101 may also be referred to as an access point, access terminal, base, base station, Node-B, eNode-B, Home Node-B, Home eNode-B, relay node, or by other terminology used in the art. The one or more base units 101, 102 can each comprise one or more transmitters for downlink transmissions and one or more receivers for receiving uplink transmissions. The base units 101, 102 are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of access and core networks are not illustrated but are well known generally by those having ordinary skill in the art.

In FIG. 1, the one or more base units can serve a number of remote units 103, 104, 105, 106, 107 within a corresponding serving area, for example, a cell or a cell sector, via a wireless communication link. The remote units 103, 104, 105, 106, 107 may be fixed or mobile. The remote units 103, 104, 105, 106, 107 may also be referred to as subscriber units, mobiles, mobile stations, users, terminals, subscriber stations, user equipment (UE), user terminals, wireless communication devices, or by other terminology used in the art. The remote units 103, 104, 105, 106, 107 can include one or more transmitters and one or more receivers. In FIG. 1, the base unit 101 can transmit downlink communication signals to serve remote units 103, 105, 107 in the time and/or frequency and/or spatial domain. The remote units 103, 105, 107 can communicate with base unit 101 via uplink communication signals. A remote unit 104, 106 can communicate with base unit 102 and/or base unit 101. Sometimes the base unit 101 is referred to as a serving, or connected, or anchor cell for the remote units 103, 105, 107 and correspondingly base unit 102 is referred as an anchor cell for remote units 104, 106. The remote units 103, 104, 105, 106, 107 may have half duplex (HD) or full duplex (FD) transceivers. Half-duplex transceivers do not transmit and receive simultaneously whereas full duplex terminals do. The remote units may communicate with the base units via a relay node. Conventionally, a single point operation is when an anchor base unit (for example, 101) transmits data to remote units (for example, 103,105, 107 here) served by it. In a multiuser scheme, such a base unit 101 may transmit data simultaneously over the air and on the same set of REs/RBs to two or more users 103, 105, 107. In Coordinated Multipoint MIMO (CoMP) operation, two or more neighboring base units 101, 102 may transmit simultaneously to one or more units 103, 104, 105, 106, 107 by coordinating data to be transmitted to the individual users and take into account interference channel related information. In such a case, a remote unit exchanges control information with its anchor base unit, but may receive transmissions from other base units. It may be partly or fully unaware (or blind to) of the exact details/parameters of such coordinated transmission.

In one implementation, the wireless communication system can be compliant with the $3^{rd}$ Generation Partnership Project (3GPP) Universal Mobile Telecommunications System (UMTS) Long Term Evolution (LTE) protocol, also referred to as Evolved Universal Mobile Telecommunications System (UMTS) Terrestrial Radio Access (EUTRA) or Release-8 (Rel-8) 3GPP LTE or some later generation thereof (for example, Release-10 or LTE-Advanced), wherein the base unit 101 can transmit using an orthogonal frequency division multiplexing (OFDM) modulation scheme on the downlink and user terminals 103, 104 can transmit on the uplink using a single carrier frequency division multiple access (SC-FDMA) scheme. More generally, however, the wireless communication system 100 may implement some other open or proprietary communication protocol, for example, WiMAX, among other protocols.

Figure 2:
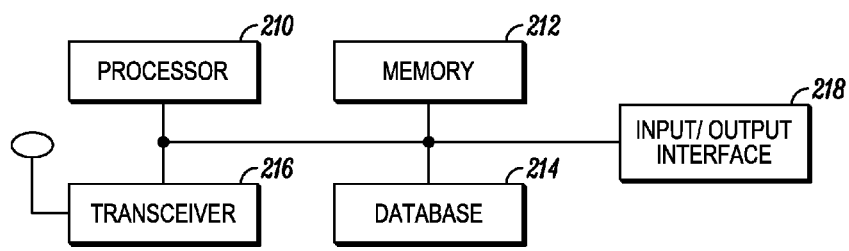
FIG. 2 is an exemplary schematic block diagram of a wireless communication unit according to a possible embodiment.

In FIG. 2, a wireless communication unit or terminal 200 can include a controller/processor 210 communicably coupled to a memory 212, a database interface 214, a transceiver 216, and an input/output (I/O) device interface 218 connected through a system bus 220. The wireless communication unit 200 may be implemented as a base unit or a remote unit and can be compliant with the protocol of the wireless communication system within which it operates, such as, for example, the 3GPP LTE Rel-8 or later generation protocol discussed above. In FIG. 2, the controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In FIG. 2, the memory 212 may include volatile and nonvolatile data storage, including one or more electrical, magnetic or optical memories such as a random access memory (RAM), cache, hard drive, read-only memory (ROM), firmware, or other memory device. The memory 212 may have a cache to speed access to specific data. Data may be stored in the memory 212 or in a separate database. The database interface 214 may be used by the controller/processor 210 to access the database. The transceiver 216 can be capable of communicating with user terminals and base stations pursuant to the wireless communication protocol implemented. In some implementations, for example, where the wireless communication unit 200 is implemented as a user terminal 103, the wireless communication unit 200 can include an I/O device interface 218 that connects to one or more input devices that may include a keyboard, mouse, pen or finger-operated touch screen or monitor, voice-recognition device, or any other device that accepts input. The I/O device interface 218 may also connect to one or more output devices, such as a monitor, printer, disk drive, speakers, or any other device provided to output data.

In operation, the transceiver 216 can receive a message providing information of a set of allocated resource elements carrying data intended for the wireless terminal 200. The transceiver 216 can receive an indication corresponding to a resource element of a particular type within the set of allocated resource elements. The processor 210 can control operations of the wireless terminal 200. The processor 210 can decode resource elements that carry data intended for the wireless terminal 200 based on the message providing information and based on the indication.

Referring back to FIG. 1, the network base station 101 may have a set of physical antennas 108 for making a data transmission to the UE devices 103, 105, 107. A network base station 101 may coordinate with one or more other network base stations 102 to make the data transmission. A data transmission may be the act of sending data, regardless of the type of data or the form of the transmission. A data transmission may encompass one or more data streams via one or more effective channels. An antenna port may be associated with an actual or effective channel observable to a UE device 103. One physical antenna 108 may map directly to a single antenna port, in which an antenna port corresponds to an actual physical antenna. Alternately, a set or subset of physical antennas 108, or antenna set 108, may be mapped to one or more antenna ports after applying complex weights, a cyclic delay, or both to the signal on each physical antenna 108. The physical antenna set 108 may have antennas from a single base station 101 or from multiple base stations. The weights may be fixed as in an antenna virtualization scheme, such as cyclic delay diversity (CDD). The associated pilots may be different or common to all UE devices 103, 104, 105, 106, 107. The procedure used to derive antenna ports from physical antennas 108 may be specific to a base station 101 implementation and transparent to the UE devices 103, 104, 105, 106, 107.

Figure 3:
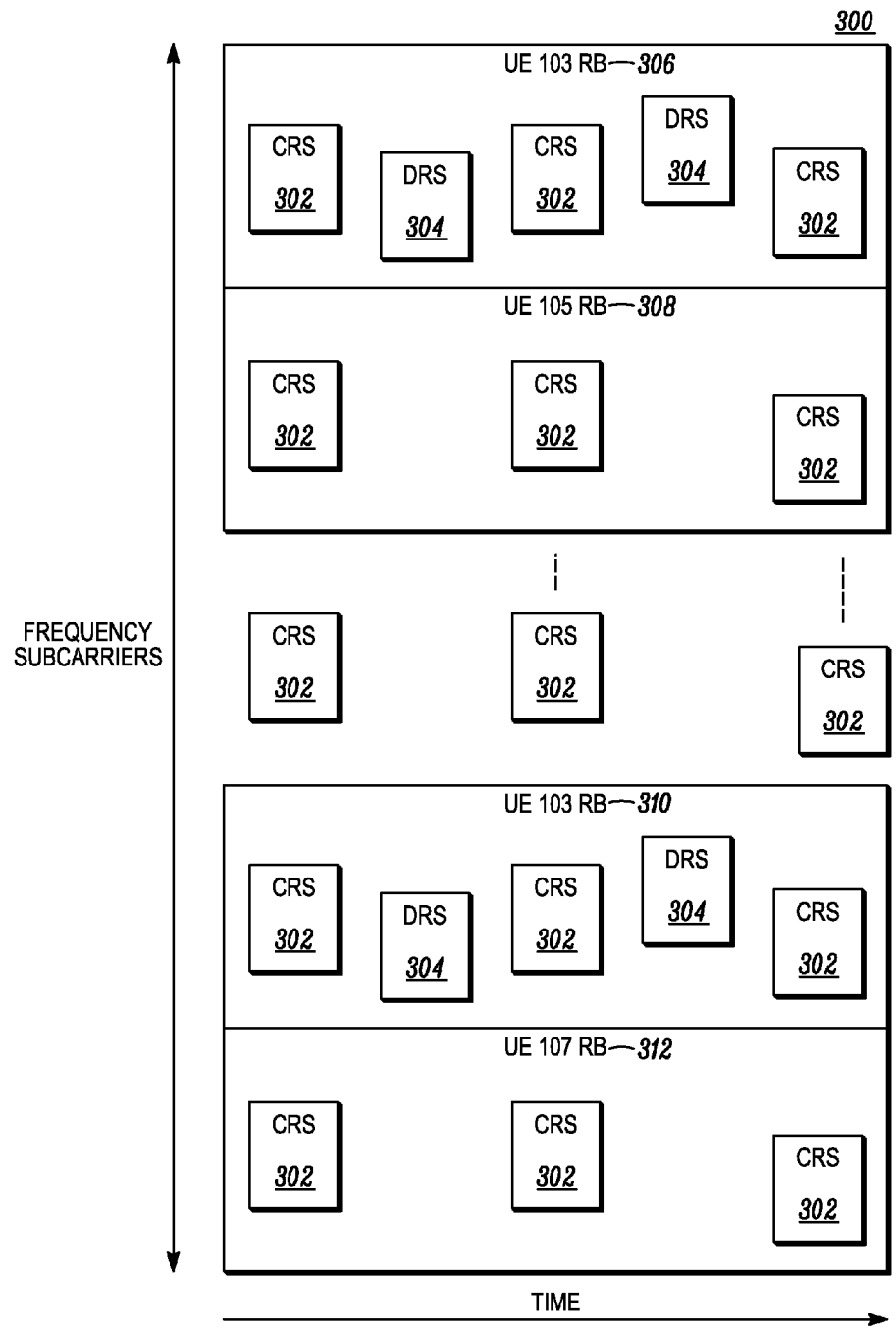
FIG. 3 is an exemplary illustration of resource allocation to different users in an OFDM communication system according to a possible embodiment.

In an orthogonal frequency division multiplexing (OFDM) system, the entire bandwidth can be divided into orthogonal subcarriers. A frequency subcarrier over a period of one OFDM symbol can be referred to as a resource element (RE). A set of OFDM symbols forms a subframe within which the base station 101 can allocate a set of REs in time and/or frequency domain to each UE for data transmission. An example of a subframe in an OFDM system is shown in FIG. 3 where UE 103, 105, and 107 are each allocated with a set of REs in that subframe. These allocations may or may not be adjacent in the frequency domain. There may or may not be a definition of Resource Block (RB) which is a set of contiguous (or even non-contiguous) subcarriers in frequency domain over a duration of several OFDM symbols. If RB is defined as a base unit of allocation, which is assumed in FIG. 3, resource allocation can be in multiples of RBs. Note that RE allocation to each UE can consist of multiple RBs that may or may not be adjacent to each other. In FIG. 3, allocation to UE 103 comprises of 2 non-adjacent RBs (i.e., RB 306 and RB 310).

A UE typically receives a control message that provides information of a set of allocated REs carrying data symbols intended for the UE. Such an allocation may be represented as a number of RBs, along with their locations. It is generally understood to each UE that within the allocation, typically there are non data-carrying REs that are used as pilots or reference symbols (RS) whose locations are known to the UE. RS are provided for UEs to estimate the channel for the purpose of data demodulation or some kind of measurement as required to be reported back to the base station. As described before, there may be two types of RS: cell-specific RS or CRS that are intended for use by all UEs in that cell and dedicated (i.e., user-specific) RS or DRS that are intended for use by the particular UE only.

In the example of frame structure shown in FIG. 3, a base station 101 may send reference symbols in both time and frequency domains to enable UE 103, 105, and 107 to obtain channel knowledge in both domains for demodulation. The set of CRS 302 may be scattered across the entire system bandwidth to allow UE 103, 105, and 107 to estimate the channel for the whole band. The set of CRS 302 may be scattered across the time, or frame, so that all UE served by the same base station may track the time variation of the channel. CRS are sent regardless of the number of UEs and their allocation.

In FIG. 3, DRS 304 may also be sent to enable a particular UE 103 to obtain an effective channel that is only useful for that UE's data demodulation. Typically, the base station 101 may embed DRS 304 in the user-specific allocation resource regions. It needs to be pointed out that even though both types of RS are shown in FIG. 3, they may or may not be present simultaneously. For example, there may be only DRS or only CRS present in the system. From each UE's perspective, DRS may or may not be present. For example, UE 103 is allocated with DRS in its allocated RBs 306 and 310, while UE 105 is not allocated with any DRS.

More details are provided in the following on the function of CRS and DRS in an OFDM transmission, where the transmitter has multiple antennas and the receiver has at least one and typically more than one antenna. Common reference symbols or cell-specific reference symbols (CRS) may be sent from the base station 101 intended for all UE devices in the cell as mentioned before. The CRS pattern (i.e., RS locations and their values) may differ from cell to cell, thus the term "cell-specific," but they can be used by all UEs in the cell, thus the term "common." A UE device typically learns about the CRS pattern after it acquires the knowledge of a cell ID. For example, in 3GPP LTE, CRS have a uniform spacing with a starting location in frequency domain having an offset that depends on the Cell ID. There are three possible offset values wherein the offset is relative to the first RE in an RB.

In the case of multiple transmit antennas, the CRS may often be divided into a number of subsets, each subset corresponding to a physical antenna port or a "virtual" antenna port where the virtualization process may have a group of radiating elements transmitting the same signal in a fixed manner as explained earlier. In a virtualization process, the signal may be pre-determined based on a base station 101 implementation, but otherwise common and transparent to all UE devices. In the example of LTE specification again, CRS may be divided into 1, 2 or 4 subsets corresponding to 1, 2 or 4 antenna ports whose number is announced by the eNB. The actual physical antennas or radiating elements may belong to one or more such subsets used for virtualization. More generally, virtualization may be viewed as mapping a set of radiating elements to a set of common antenna ports, where such virtualization is common to all UEs.

As opposed to CRS that are intended for all UEs, dedicated reference symbol (DRS), or user-specific pilots, may be intended for a particular UE. In a typical operation, a DRS may be embedded within the user's allocation, such as subcarriers or subbands or RBs as defined in LTE. A DRS may correspond to "precoded" reference symbol, where precoding may be performed in a similar way to the precoding applied on data symbols.

The "precoding" operation is explained in the following. The base station transmits a signal via weighting each antenna signal with a complex value, an operation referred to as precoding, which may be mathematically represented by the matrix equation:

$$Y = HVs + n$$

in which, when transmitting one data stream, or rank-1, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_1 \\ \vdots \\ v_{N_T} \end{bmatrix} s + n$$

in which, when transmitting two data streams, or rank-2, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_{1,1} & v_{1,2} \\ \vdots & \vdots \\ v_{N_T,1} & v_{N_T,2} \end{bmatrix} \begin{bmatrix} s_1 \\ s_2 \end{bmatrix} + n$$

where $y_1 \ldots y_{N_R}$ may be the received data at the UE receive antenna #1 to #$N_R$, respectively. In the example with a rank-1 transmission, or a transmission with one data stream denoted as "s", V may be a precoding vector with weights $v_{1,1} \ldots v_{N_T,1}$ for base station transmit antenna #1 to #$N_T$ respectively. In an embodiment with a rank-2 transmission, or a transmission with two data streams s1 and s2 on the same subcarrier, V may be a precoding matrix. Matrix H may be the propagation channel matrix between transmit antennas and receive antennas, with entry $h_{ij}$ representing a channel between the jth transmit and ith receive antennas. Value n may represent noise and interference. The precoding weights V, either a vector or matrix, may be determined by the base station, typically based on the channel particular to the UE or can be UE-specific and may also take into account a preference indicated by feedback from the UE. Further the matrix HV can be referred to as the effective channel between a user's data streams and its receivers. Effective channel, instead of the propagation channel H, is all a UE needs for demodulation purpose. The precoding weights may or may not be constrained to a predefined codebook that consists of a set of pre-defined vectors or matrices. In an embodiment with constrained precoding, the precoding matrix may be signaled by the base unit efficiently with a precoding matrix index (PMI), or an index to a precoding matrix within a predefined codebook. The term "matrix" may include the degenerated special case of vector. In the most generic sense, the term "precoding" may refer to any possible transmission scheme that may be deemed as mapping a set of data streams to an antenna set using a matrix V. The term "precoding" may include an "open-loop" transmission as a special "precoding" with unweighted antennas and any antenna virtualization schemes, such as cyclic delay diversity (CDD).

The applied precoding could be based on corresponding feedback from the UE or channel measurements at a base station. In a simple single-user single base unit scheme, one set of DRS could be defined corresponding to the effective precoded channel (i.e., "HV" in the above equation). If two streams are transmitted to a user in a rank-2 transmission, then only 2 DRS ports (i.e., 2 subsets of DRS each corresponding to a precoded antenna port) are sufficient, even though the actual signal transmission may come from all the $N_T$ antennas at the base unit where $N_T$ can be greater than 2.

In another method, an effective channel may also be constructed based on CRS which carry the information of propagation channel and the user-specific precoding matrix signaled to a UE.

Figure 4:
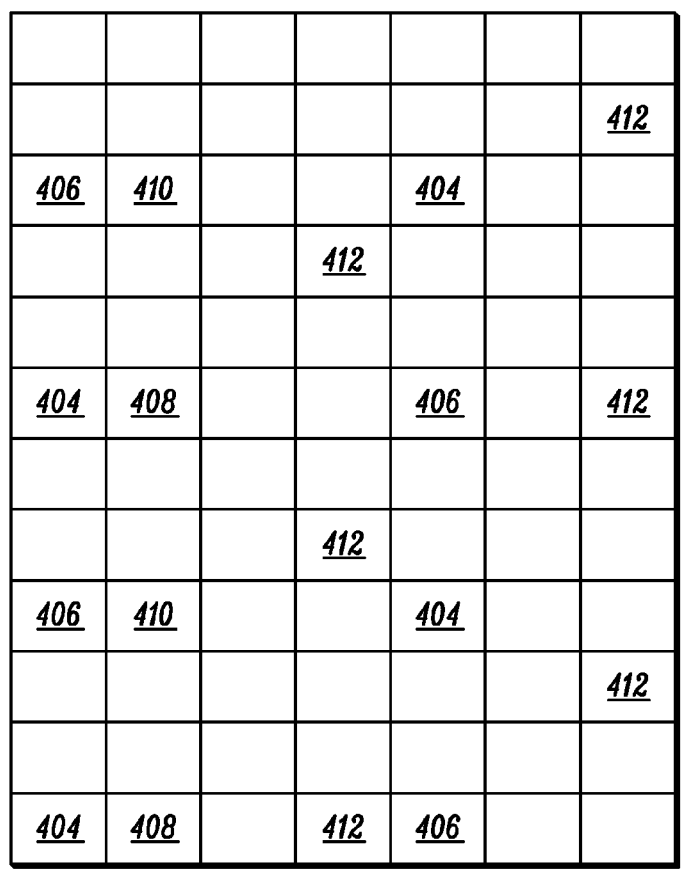
FIG. 4 is an illustration of a resource block (RB) as in Release-8 specification of LTE with Common RS (CRS) and Dedicated RS (DRS)

As it can be seen that one of the difference between DRS and CRS is that the presence of DRS is often known and of interest to a particular UE. FIG. 4 illustrates, in a block diagram, one embodiment of how DRS and CRS may be embedded in a RB. Note that there may or may not be a definition of RB in a frame when REs are assigned to a set of UEs. The RB 400 shown in FIG. 4 can correspond to RB 306 in FIG. 3. In particular, the example RB shown in FIG. 4 is an RB as defined in the LTE specification. RB in LTE spans 12 subcarriers in frequency and spans a slot in time, where two slots form a "subframe", and each slot is composed of 7 OFDM symbols in time. CRS shown in an RB 400 may be divided into several subsets with each being associated with a different antenna port. For example, a RB 400 may have a first CRS subset 404 associated with an antenna port #0 and a second CRS subset 406 associated with an antenna port #1, respectively with each subset having four locations in an RB 400. Further, the RB 400 may have a third CRS subset 408 associated with an antenna port #2 and a fourth CRS subset 410 associated with an antenna port #3. In addition to any CRS transmitted from the base station 101, additional DRS may also be transmitted within the UE-specific allocation. The RB 400 may have a set of DRS 412, in this example six DRS 412, associated with a "precoded" antenna port #5. In this case, the antenna port #5, rather than being an actual antenna, may correspond to the effective channel seen at the UE device 103 after the base station 101 applies precoding on a set of physical antennas 108. The precoding may take the form of beamforming, where a vector of weights may be applied to an antenna set to obtain an effective channel.

DRS pattern (i.e., DRS locations and the associated reference symbol values) is known to the UE as a predetermined function of some parameters such as cell ID and user ID.

Figure 5:
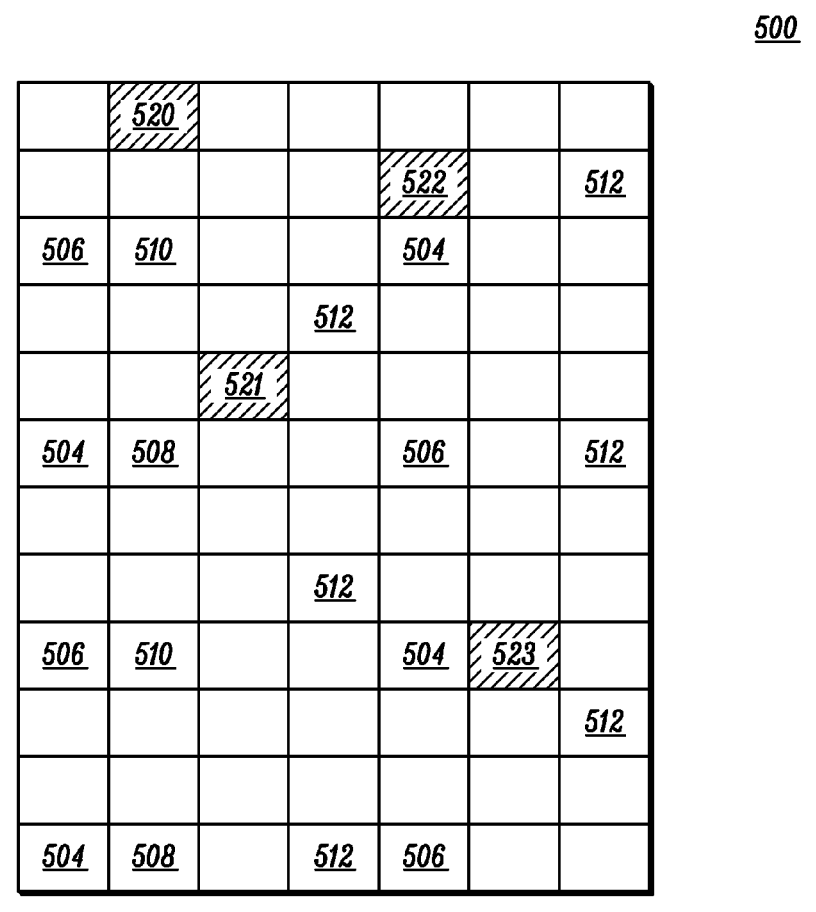

In a traditional operation, once the UE knows all the RS locations as described above, the UE knows the data-carrying REs within its allocation. The UE will demodulate these data-carrying REs and decode the information intended for itself. However, there may be a need for a base station to further designate a set of particular type of RE within the set of allocated REs for special usage. For the sake of convenience in later description, we also refer to RE of a particular type as "special RE" sometimes. An example of REs of a particular type within an RB is shown in FIG. 5. Compared with FIG. 4, special REs 520, 521, 522, and 523 are shown. Note that number of special REs and their location shown in FIG. 5 are just example for illustration purposes. Of course, the presence of special REs is independent from the presence and pattern of CRS, or DRS, or both as shown in FIG. 4 and FIG. 5. The UE, after receiving such indication corresponding to a RE of a particular type, can treat these special RE differently from normal data-carrying RE in the process of data demodulation and decoding.

Before discussing the usage of these REs of a particular type, it is noted that such indication corresponding to the RE of the particular type may be just a bit-field within the control message received from the base station that provides information of the set of allocated REs in a normal operation. Such indication may include the indication of the presence or absence of any such RE of a particular type. If these special REs are indeed present, the indication may include the locations of at least one RE of a particular type, as well as possibly the information about the nature of the special REs so that a UE knows how to treat them.

There are many ways to convey the location information of special REs. In one example, the information is conveyed as an index to a set of predefined and allowable patterns. In another example, the location information of the special REs is indicated by a value representing a relationship to a known reference pattern. For instance, the reference pattern can be cyclic shifted (i.e. offset) in frequency or time domain to get the special RE locations. The known reference pattern may correspond to any RS pattern as long as it is known to the UE. It can be a cell-specific RS pattern of a serving or a neighboring cell known to the UE, or a user-specific RS pattern known to the UE.

Figure 6:
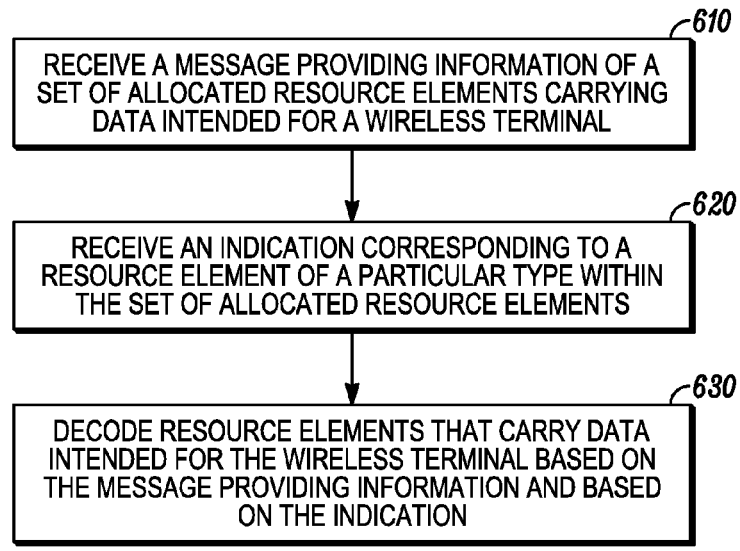
FIG. 6 is a flowchart of an embodiment of operation at the User Equipment (UE)

FIG. 6 is an exemplary flowchart outlining the operation of a method according to one embodiment. At 610, a message is received that provides information of a set of allocated resource elements carrying data intended for a wireless terminal. At 620, an indication is received that corresponds to a resource element of a particular type within the set of allocated resource elements. At 630, resource elements that carry data intended for the wireless terminal are decoded based on the message providing information and based on the indication.

Figure 7:
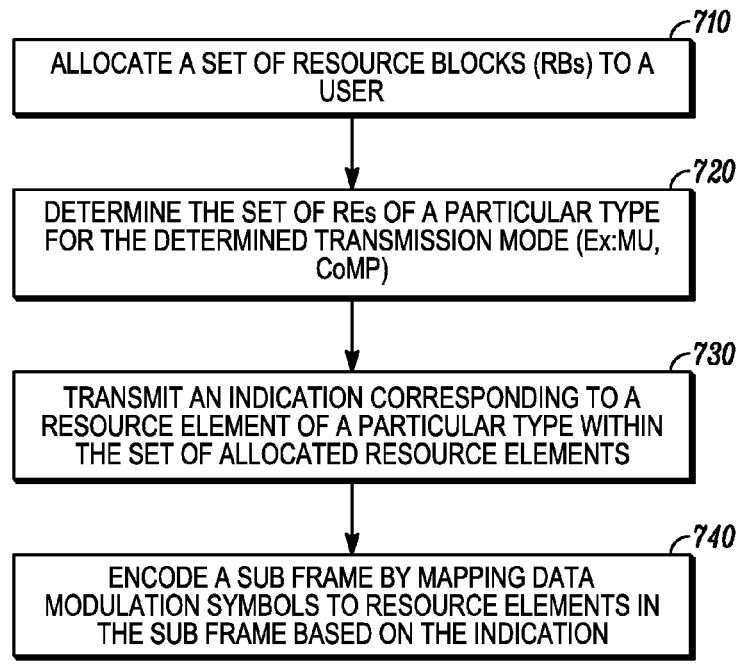
FIG. 7 is a flowchart of an embodiment of operation at the Base unit.

FIG. 7 is an exemplary flowchart outlining the operation of a method according to one embodiment. At 710, a set of resource blocks are allocated to a user and a message providing information of the set of allocated resource elements carrying data intended for a wireless terminal is transmitted to the wireless terminal. At 720, the set of resource elements of a particular type are determined for a desired transmission mode, such as multi-unit or coordinated multipoint. At 730, an indication is transmitted that corresponds to a resource element of a particular type within the set of allocated resource elements. At 740, a sub frame is encoded by mapping data modulation symbols to resource elements in the sub frame based on the indication.

The use case of REs of a particular type is discussed in the following embodiments.

In one embodiment, the RE of a particular type is an RE that does not contain any information data symbol intended for the UE. Therefore, the UE should ignore those special REs during data demodulation and decoding.

Figure 8:
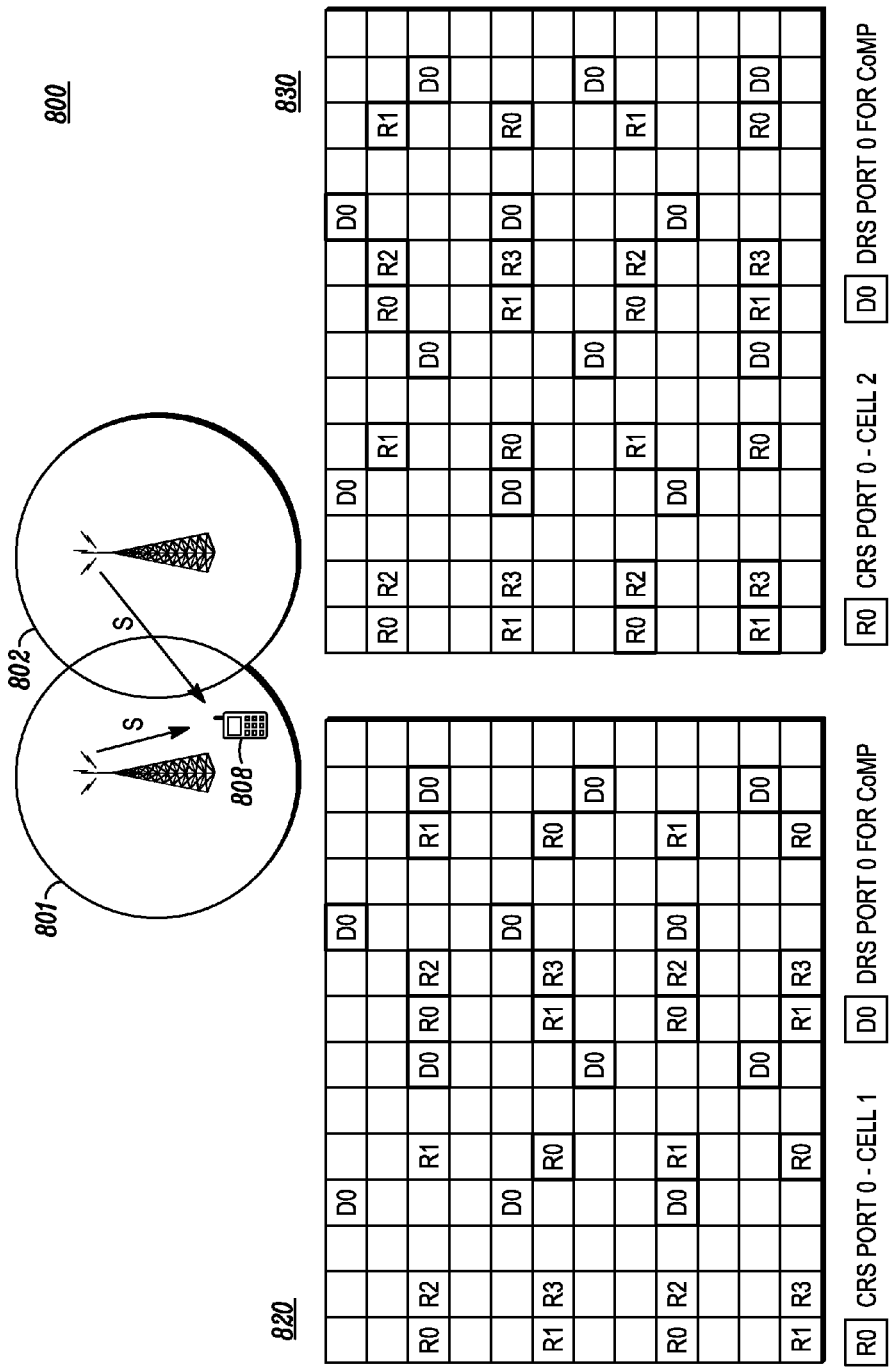
FIG. 8 is an embodiment illustration of Coordinate Multipoint (CoMP) operation with the reference symbol REs and an example of REs of a particular type.

This scenario arises when two or more cells serve the same UE in a coordinated transmission (i.e., CoMP as mentioned earlier). Consider the example of coordinated transmission between two base stations 801, 802 to a single UE 808 as illustrated in FIG. 8. Both base stations 801, 802 jointly transmit same data to the UE 808, which is nominally served by, say, its serving cell base station 801. In this example, the base station 802 is the coordinating (or "assisting") base station from the perspective of UE 808. This advanced CoMP operation can require that the base stations 801, 802 have the same data content intended for UE 808. But UE 808 may not be aware of the actual transmission points and hence, from its perspective, it just assumes normal transmission from base station 801. As described earlier, the use of DRS can make such operation possible as long as the DRS are sent in the same way as data-carrying REs. UE 808 knows the DRS pattern if base station 801 also uses them in the case of no coordination. UE 808 may well assume the same DRS pattern even with coordination, especially since the coordination is blind to the UE.

Meanwhile, the coordinating base station 802 may often still need to transmit CRS as needed by UEs that deem base station 802 as the serving cells, with or without any coordinated transmission. As mentioned before, the CRS pattern for each cell can be different depending on cell ID. In the example as illustrated in FIG. 8, the CRS locations for base station 802 is an offset or shift in frequency domain from the CRS locations for base station 801. It can be seen from FIG. 8 that a normal data-carrying RE for UE 808 may correspond to a CRS location of the coordinating base station 802, which further means that, at those REs, the base station 802 cannot coordinate the transmission to UE 808 with base station 801 the same way as at other REs. To avoid performance loss at UE 808, base station 801 and 802 may choose to transmit data only on the set of REs without such conflict. In this case, base station 801 needs to indicate to UE 808 that those normally data-carrying REs are now REs of a particular type, and further more in this embodiment, the special REs does not contain any information data symbol intended for UE 808 and thus should be ignored during data demodulation and decoding.

In another embodiment, the indication corresponding to the resource element of a particular type corresponds to the indication of superposition of reference and data symbols on at least one resource element of the particular type. This can be considered as a modification of the above embodiment, where the special REs still carry data symbols intended for UE 808, except for the fact that these RE will be different than normal data-carrying REs in the sense that base station 802 cannot coordinate the transmission due to its CRS transmission obligation. Hence UE 808 receives signal on these special REs the superposition of information data symbols sent form its serving cell 801 and the reference symbols from some other base station (cell 802 in this case, but could even be other base station). The indication of these special REs serves the purpose of alerting the UE to potentially process them in a different way from other data-carrying REs. For example, the UE may elect to suppress the interference of the superposed reference symbol before further extracting useful information from these special REs.

In the above embodiments, the special REs are introduced due to coordinated transmission from more than one base station where a coordinating base station is obligated to transmit its own CRS that could be at an offset location with respect to CRS of the serving cell. The location of special RE can be easily indicated as a frequency-domain offset (i.e., shift) value where the offset is with respect to a reference pattern, which corresponds to the CRS locations of the serving cell in this case. Of course if the cell ID of coordinating cell 802 is known to UE 808, the UE can also derive the special RE pattern. However, it may be more efficient to signal the shift value than to signal the cell ID of other cells because typically only a limited shift values are possible (e.g., 3 corresponding to shift values of 0,1,2 in LTE specifications). The offset value can be, for example, conveyed as an additional field to the Downlink Control Information (DCI) format, which is the control message providing information of dynamic resource allocation to a UE. Furthermore, signaling the shift, due to the small overhead, can enable more dynamic switching between different transmission modes that require different configurations of special REs.

The usage of special REs is not limited to above coordinated transmission cases. In another embodiment, the indication corresponding to the resource element of a particular type corresponds to the indication of a reference symbol pattern specific to a different wireless terminal. Special REs can be useful for multi-user transmission where a base station transmits different information data symbols to more than one UE at the same set of REs. However, each UE may have different RS. So reference symbols for a UE could be signaled to another UE as special REs.

Figure 9B:
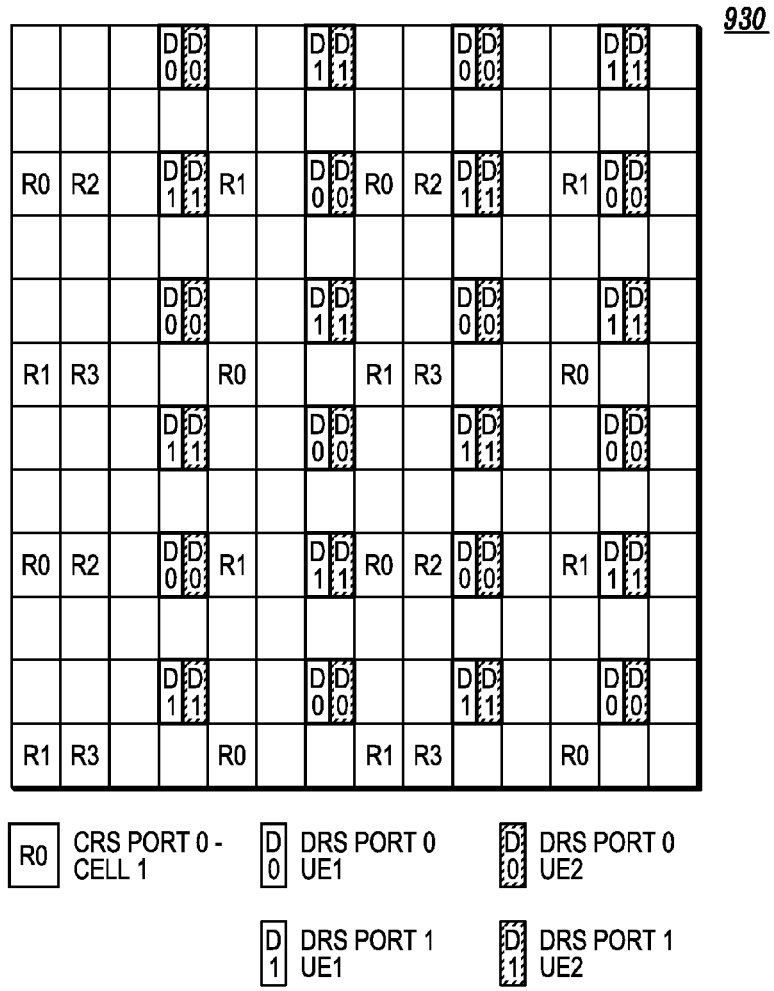
FIG. 9 is an embodiment illustration of Multiuser (MU) operation with the reference symbol REs and an example of REs of a particular type.

FIG. 9 is an exemplary illustration of resource blocks 910, 920, and 930 according to the above embodiment for multiuser transmission. In this case, if DRS are employed, a different DRS port can be allocated for each stream and each UE. For example if rank-2 transmission is performed to each of the two UEs for a total of four streams transmitted, then four DRS ports may be allocated. They can be allocated by FDM (frequency division multiplexing or sharing in frequency) as in 910 (two UEs with one stream each), CDM (Code division multiplexing or sharing in code domain) as in 920 (two UEs with one stream each) or a combination of FDM and CDM as in 930 (two UEs with two streams each). However, each individual UE should to be aware of DRS ports corresponding to its streams in each case. In presence of DRS for other UE, additional information of these ports may be useful to the UE.

In one implementation, in 910, data symbols are not mapped to any of the DRS REs. In this case from any UE's perspective, the DRS for the other UE(s) are indicated as special REs that do not contain data information symbols intended for this UE. Again, the information of special RE locations may be conveyed as a shift or offset relative to the reference DRS location known to that UE.

In a modification of the above implementation, data is still transmitted on special REs, superposed with DRS for other users. Specifically, in the locations of DRS port 0 for UE 0 illustrated in 910, data for UE1 may be mapped. This does not result in significant performance degradation, if the users are spatially separated and the post-precoded signal power of each user is small as observed by other user. This is possible, for example, by improved feedback/channel state information at the base units, which enables them to choose good user pairs with such separation and good selection of precoding matrices. In such cases, it is further possible that the DRS signals are boosted by a fixed factor with respect to the data for improving channel estimation. A UE can take advantage of the knowledge of location of the RS ports of the other UEs in MU transmission (signaled as special REs), to modify its interference calculations for decoding. More specifically, the knowledge of superposition of other user's DRS on its data coupled with the boosting factor may be used to modify interference/noise variance estimates at these locations. In addition to the special RE locations, with the additional knowledge of other user's pilot sequence (usually depending on the CellID and a user identifier), a UE can estimate channel of another UE for interference cancellation.

In one embodiment, the REs of a particular type are REs on which there is an absence of any signal transmission from one or more cells. The provisioning of such special RE is to allow the UE to "sniff" the interference characteristic.

The concept of indicating REs of a particular type can be generally applied to many other scenarios where there is a need to have the UE to be aware of the special REs. For example, it can be used to insert additional RS. A UE that has the capability to at least ignore the special REs can mitigate any potential impact due to future evolution of the standards when special REs need to be carved out for special purposes.

In an example, CRS corresponding to up to 4 antennas are defined in release 8 of LTE specification. When more than 4 antennas are supported in a future version of the LTE specification, some type of RS for each antenna may be required to allow UE to measure the full spatial characteristic of the channels. They can then be referred to as CSI-RS (as in Channel State Information), or CQI-RS (Channel Quality Information), or LCRS (Low Density CRS). For these measurements, as opposed to demodulation, RS can be transmitted less frequently in time. Nevertheless, when the insertion of new CSI-RS corresponding to different or additional antennas can be performed by converting some normal data-carrying REs to special REs, it is still good to signal those REs to avoid any performance impact on UE demodulation.

In a future version of the specification (LTE-A/Release 10), CRS ports are not necessarily mandated in every RB. Further, dedicated LTE-A subframes may also be allocated in systems supporting Release-8 UEs, which do not have to support CRS. In such a case, up to 8 DRS ports may be defined to support as many as 8 data streams with eight transmit antennas. These may be all be targeted at a single user or to multiple users. The different patterns possible with different assignments of number of users, number of streams per user and FDM/CDM can be efficiently mapped to set of useful patterns representing locations of REs of a particular type, e.g., data erasures or increased interference or locations to estimate an interfering channel, which can be indexed with a pre-defined mapping and signaled as a bit pattern in downlink control signaling.

We claim:

1. A wireless communication terminal comprising:
   a transceiver configured to:
      receive an indication corresponding to a first set of one or more resource elements of a particular type within a set of allocated resources, wherein the indication includes superposition information of reference symbols and data symbols;
      receive data symbols from a first base station; and
      receive reference symbols from a second base station; and
   a processor coupled to the transceiver, wherein the processor is configured to:
      determine resource elements that carry data intended for the wireless communication terminal from the set of allocated resource elements, wherein the resource elements that carry data intended for the wireless communication terminal exclude at least resource elements associated with the first set of one or more resource elements of a particular type,
      decode the resource elements that carry the data intended for the wireless communication terminal based on the determined resource elements that carry the data intended for the wireless communication terminal.

2. The terminal of claim 1, wherein the first set of one or more resource elements of the particular type are shifted relative to a known reference signal pattern.

3. The terminal of claim 2, wherein the known reference signal pattern corresponds to a reference signal pattern of a serving cell of the wireless communication terminal.

4. The terminal of claim 2, wherein the known reference signal pattern comprises a second set of one or more resource elements.

5. The terminal of claim 1,
   the processor configured to decode the data symbols using knowledge of the reference symbols received from the second base station.

6. The terminal of claim 5, the processor configured to suppress interference prior to extracting information from the first set of one or more resource elements of a particular type.

7. The terminal of claim 1, wherein the indication corresponding to the first set of one or more resource elements of the particular type includes an index of a known reference signal pattern within a set of reference signal patterns known to the wireless communication terminal.

8. The terminal of claim 1, wherein the indication corresponding to the first set of one or more resource elements of the particular type comprises a bit field in a control message.

9. The terminal of claim 1, wherein the indication corresponding to the first set of one or more resource elements of the particular type includes a shift value for shifting the known reference signal pattern.

10. The terminal of claim 9, wherein the shift value is from among a set of values including 0, 1 and 2.

11. A method in a wireless communication terminal, the method comprising:
   receiving a control message providing information of a set of allocated resource elements intended for the wireless communication terminal;
   receiving an indication corresponding to a first set of one or more resource elements of a particular type within the set of allocated resource elements, wherein the indication includes superposition information of reference symbols and data symbols;
   receiving, at the wireless communication terminal, data symbols from a first base station;
   receiving, at the wireless communication terminal, reference symbols from a second base station;
   determining the resource elements that carry data intended for the wireless communication terminal excluding at least the resource elements associated with the first set of one or more resource elements of a particular type; and
   decoding the resource elements that carry the data intended for the wireless communication terminal based on the determined resource elements that carry the data intended for the wireless communication terminal.

12. The method of claim 11,
   decoding the data symbols using knowledge of the reference symbols received from the second base station.

13. The method of claim 12 further comprising suppressing interference prior to extracting information from the first set of one or more resource elements of a particular type.

14. The method of claim 11, wherein the first set of one or more resource elements of the particular type are shifted relative to a known reference signal pattern.

15. The method of claim 14, wherein the known reference signal pattern comprises a second set of one or more resource elements.

16. The method of claim 14, wherein the known reference signal pattern corresponds to a reference signal pattern of a serving cell of the wireless communication terminal.

17. The method of claim 11, wherein the indication corresponding to the first set of one or more resource elements of the particular type includes an index of a known reference signal pattern within a set of reference signal patterns known to the wireless communication terminal.

18. The method of claim 11, wherein the indication corresponding to a first set of one or more resource elements of a particular type comprises a bit field in the control message.

19. The method of claim 11, wherein the indication corresponding to a first set of one or more resource elements of a particular type includes a shift value for shifting the known reference signal pattern.

20. The method of claim 19, wherein the shift value is selected from a set of values including 0, 1, and 2.

* * * * *